United States Patent [19]

Meuleman

[11] Patent Number: 4,589,690
[45] Date of Patent: May 20, 1986

[54] SEAL FOR IRRIGATION VALVE
[75] Inventor: Guy A. Meuleman, Rupert, Id.
[73] Assignee: Aqua Control, Inc., Rupert, Id.
[21] Appl. No.: 705,534
[22] Filed: Feb. 26, 1985

Related U.S. Application Data

[63] Continuation-in-part of Ser. No. 511,657, Jul. 5, 1983, Pat. No. 4,543,990.
[51] Int. Cl.⁴ .................................................. F16L 3/04
[52] U.S. Cl. ..................................... 285/162; 285/910; 16/2; 137/556
[58] Field of Search .............. 285/196, 178, 338, 162, 285/DIG. 22, 215, 208, 8, DIG. 11; 16/2; 137/556

[56] References Cited
U.S. PATENT DOCUMENTS 2,367,836  1/1945  Brown ...................................... 16/2
2,454,707 11/1948  Meyers et al. ........................ 16/2 X
3,277,234 10/1966  Dekko et al. .......................... 16/2 X
3,879,069  4/1975  Oostenbrink ........................ 285/162
4,232,421 11/1980  Tucker ............................. 285/162 X
4,291,904  9/1981  Eversen et al. ..................... 285/162

Primary Examiner—Dave W. Arola
Attorney, Agent, or Firm—Walter C. Farley

[57] ABSTRACT

A sealing structure to couple an irrigation valve through a rectangular opening in the side of a pipe includes a rectangular conduit portion and a rectangular gasket of elastomeric material. The gasket has a side wall which is wider than the other walls and flange portions which extend outwardly against the inner and outer surfaces of the pipe around the rectangular opening. The conduit includes a laterally extending flange which, upon assembly, encompasses the wider wall. Compression of the wider wall permits insertion of the other side of the conduit through the central opening in the gasket, forming a watertight seal with the rectangular opening.

8 Claims, 7 Drawing Figures

SEAL FOR IRRIGATION VALVE

CROSS-REFERENCE TO RELATED APPLICATION

This application is a continuation-in-part of Application Ser. No. 511,657, filed July 5, 1983, and now U.S. Pat. No. 4,543,990, the entire content of which is hereby incorporated by reference.

This invention relates to a seal structure for use with the conduit leading from an irrigation valve and, in particular, to a structure capable of forming a watertight seal between a rectangular conduit and a rectangular opening in the wall of a pipe.

BACKGROUND OF THE INVENTION

As described in Ser. No. 511,657, an irrigation system involving gated pipe uses rather large diameter pipe extending across the ends of irrigation channels in a field, and valves are positioned at space points along the pipe to deliver water into the irrigation channels as desired. The valve described in this co-pending application is particularly designed and intended to be suitable for use in this environment, and the application discloses techniques for coupling the valve into a rectangular opening in the side of the gated pipe. A rectangular opening is used to orient the valve relative to the pipe.

It has developed, however, that there are special problems in connection with forming a seal between the conduit leading from the valves into the gated pipe because the gated pipe has rectangular openings and because the pipe is accessible only from one side. While the valve and connection arrangement disclosed was operative, the seal was not completely watertight, allowing leakage which severely diminished the effectiveness and economic satisfactoriness of the valve system.

SUMMARY OF THE INVENTION

Accordingly, an objective of this invention is to provide a seal structure for forming a watertight seal in a rectangular opening between the edges of that opening and a rectangular conduit extending through the opening.

Briefly described, the invention comprises a seal structure for forming a watertight connection between a first rectangular opening through the wall of a pipe and a conduit leading to a valve including a gasket comprising a unitarily molded, generally rectangular body of elastomeric material having front and back surfaces and a thickness at least three times the thickness of the pipe wall. A continuous groove extends inwardly from the periphery of the body to receive the edges of the pipe wall which define the first opening. A second opening extends through the body forming first, second, third and fourth walls around the second opening, the first wall being significantly wider than the opposite wall. A conduit having a generally rectangular outer surface shaped and dimensioned to be at least as large as the second opening, but smaller than the first opening, has a hollow interior opening at the distal end of the conduit. First and second flanges protrude laterally from opposite sides of the conduit adjacent the distal end thereof, each of those flanges having a surface perpendicular to the adjacent portion of the outer surface of the conduit with the flange at one side being significantly longer than the flange at the opposite side. A stop surface on the conduit is spaced from the flanges, the distance between the stop surface and the flanges being no greater than the thickness of the body. For assembly, the conduit is coupled to the pipe by placing the gasket in the first opening with the first wall adjacent one side of the first opening and the longer flange on the conduit is then inserted through the second opening and adjacent the inner surface of the first wall of the gasket. The conduit is pushed toward the first wall to elastically compress the first wall and the other flange is then inserted through the second opening so that the stop surface is adjacent the outer, front surface of the gasket.

In order to impart full understanding of the manner in which these and other objectives are attained in accordance with the invention, particularly advantageous embodiments thereof will be described with reference to the accompanying drawings, which form a part of this specification, and wherein.

DESCRIPTION OF THE PREFERRED EMBODIMENT

Figure 1:
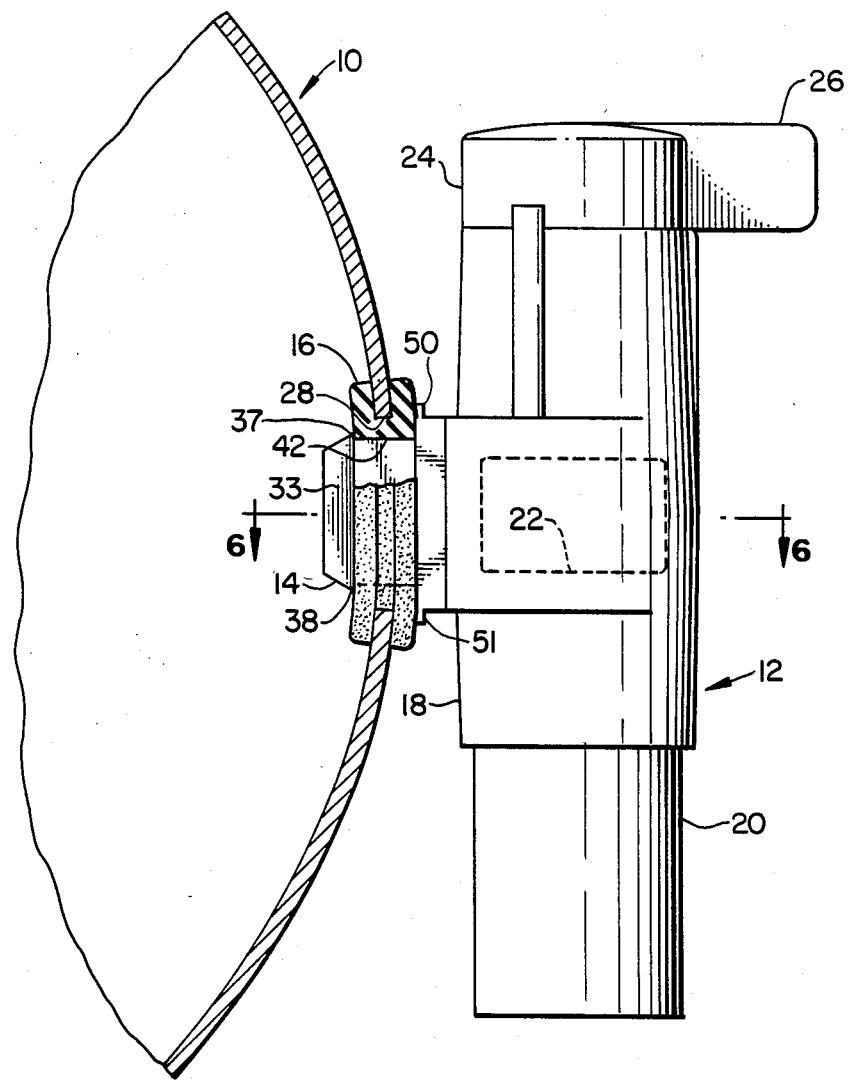
FIG. 1 is a side elevation, in partial section, of a valve having a conduit extending into the opening of a gated pipe, the gasket and conduit being formed in accordance with the present invention.

FIG. 1 shows a small portion of a relatively large diameter pipe indicated generally at 10 which is used to convey water to the channels into which it will be dispensed for irrigation. A dispensing irrigation valve indicated generally at 12 is coupled to pipe 10 by a structure including a short length of conduit 14 and a gasket 16.

Valve 12 is described in detail in Application Ser. No. 511,657 and will only be described generally herein. The valve includes a body 18 which is a hollow, tubular member fixedly attached to conduit 14. Body 18 slidably receives a tube 20, tube 20 having a generally rectangular opening 22 through the side thereof. At the upper end of tube 20 is an enlarged portion 24 having a protruding blade 26 by which the rotational position of tube 20 in body 18 can be established. When opening 22 is aligned with conduit 14, water can flow from the interior of pipe 10 through the conduit and the opening into tube 20 and out of the open lower end thereof into an irrigation channel. The degree of alignment of opening 22 with the central passage through conduit 14 establishes the quantity of flow.

As previously indicated, when opening 22 is completely non-aligned with the passage through conduit 14, it is desirable to have no water flow. This is defeated if leakage exists around gasket 16. It is therefore very important for the sealing arrangement between gasket 16 and pipe 10 as well as conduit 14 to be effectively watertight.

Figure 2:
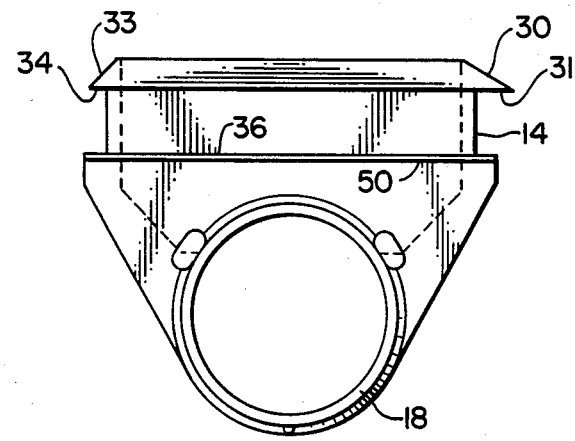
FIG. 2 is a top plan view of the valve and conduit structure usable in the assembly of FIG. 1.
Figure 6:
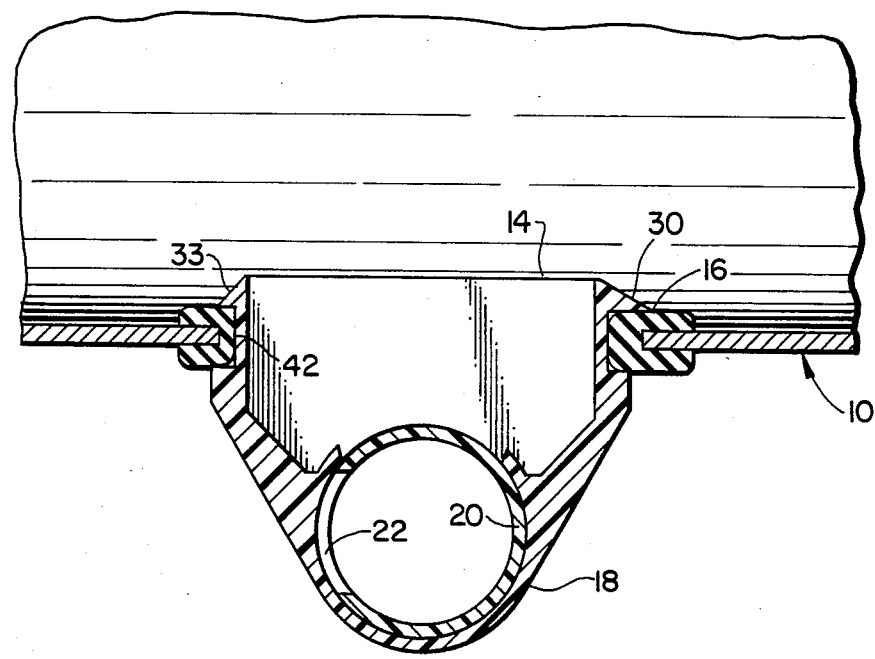
FIG. 6 is a top plan view, in section, of the installed structure.

As seen in FIGS. 1, 2 and 6, conduit 14 is a rectangular section of pipe integrally connected with body 18 by a tapered section. The exterior surface of conduit 14 is rectangular and is dimensioned to be smaller than the rectangular opening 28 through the wall of pipe 10. Typically, opening 28 has a horizontal dimension of about 2⅜ inches, this being the dimension in the axial direction of the pipe. The vertical dimension of the opening is 1¼ inches. A valve to cooperate with an opening of that size has a conduit section 14 the longer dimension of which is about 2¼ inches and the shorter dimension of which is about 1 inch.

At the distal end of conduit 14 toward one side is a flange 30 which has a surface 31 facing toward the valve member, surface 31 being perpendicular to the adjacent outer end surface of conduit section 14. At the other side of the distal end of the conduit section is a somewhat shorter flange member 33 having a similarly perpendicular surface 34. Flange surface 34 protrudes no more than ½ as far as surface 31. At the proximal end of the conduit section, the valve body is formed with a stop surface 36 which is perpendicular to the outer surface of conduit 14 and parallel with surfaces 31 and 34 of the flanges. At the top and bottom of the distal end are significantly smaller flange-like protrusions 37 and 38, seen in FIG. 1. The end of the conduit portion around these flanges is tapered to facilitate assembly of the structure as will be described.

Figure 3:
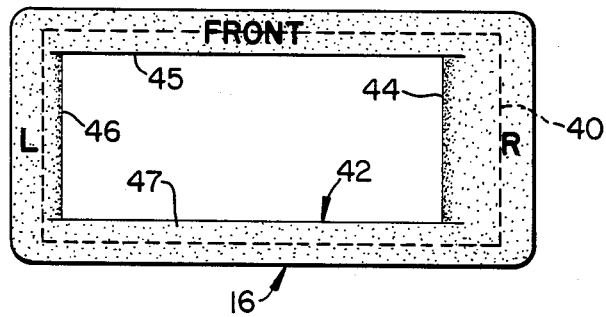
FIG. 3 is a front elevation of a gasket usable in the assembly in accordance with the invention.

The gasket 16 of this structure is separately shown in FIG. 3 and comprises a body of elastomeric material which is generally rectangular in shape and which has a thickness at least as great as three times the thickness of the wall of pipe 10. A groove 40 extends inwardly from the periphery of the body, the groove being dimensioned to tightly receive the edges of the wall which surround and define opening 28. A rectangular opening 42 penetrates the body, leaving first, second, third and fourth walls, identified as 44, 45, 46 and 47 in FIG. 3 which will form the sealing gasket members between conduit 14 and the edges of opening 28. It will be observed that wall 44 is much wider than opposite wall 46, about three times as wide, and it will also be noted that the inwardly facing surface of wall 44 is rounded or beveled so that the surface merges smoothly into the front surface, seen in FIG. 3, and can also be rounded to merge smoothly into the rear surface of the gasket. Additionally, the front edge of the inwardly facing surface of wall 46 is also rounded or beveled to facilitate assembly.

Figure 4:
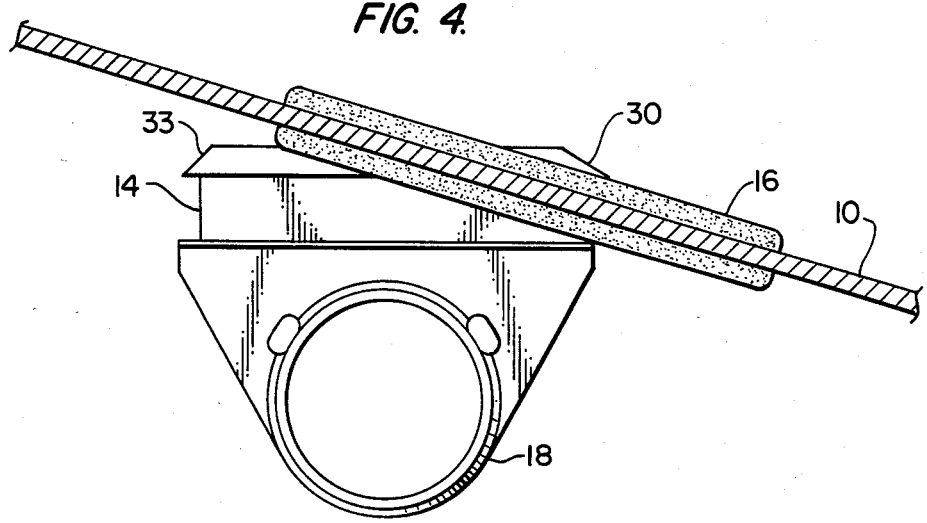
FIGS. 4 and 5 are top views showing the sequence of assembly steps for installing a structure in accordance with the invention.
Figure 5:
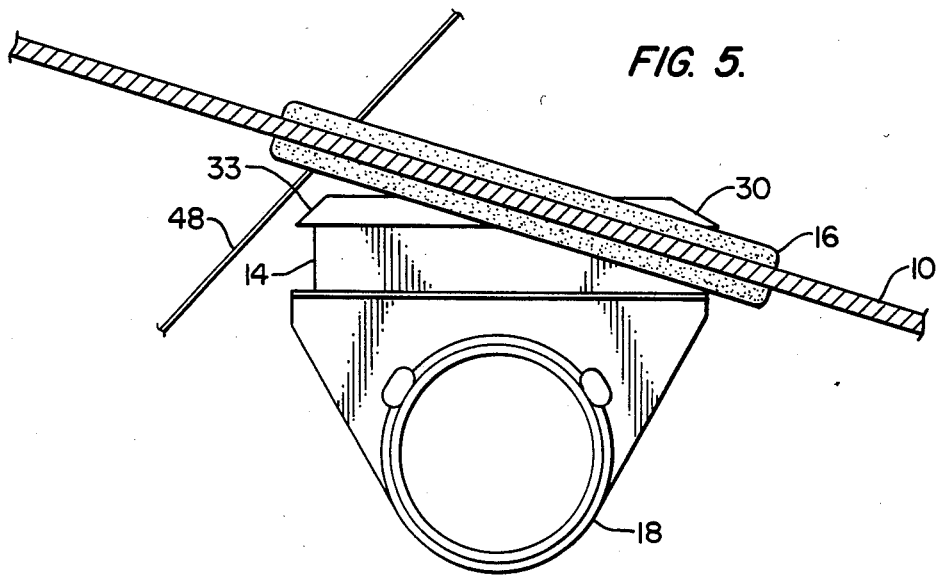

Because of this non-symmetrical construction of the gasket, it is necessary that its orientation be proper during assembly and it is therefore desirable to label the front surface as well as the left and right sides as illustrated in FIG. 3. Assembly of the structure into the pipe is illustrated in FIGS. 4 and 5. The gasket is first inserted with the thicker wall 44 to the right, as shown. Assembly is then facilitated by lubricating the inwardly facing surfaces of opening 42 with a vegetable oil. The right-hand end of the valve assembly, the end with the longer flange 30, is then inserted through opening 42 such that the flange 30 is behind the gasket. Conduit 14 is then moved to the right so that it abuts the inwardly facing surface of wall 44 and is pushed to the right to elastically compress wall 44, making sure at the same time that walls 45 and 47 are not caused to buckle inwardly toward the interior of the pipe. The other end of the conduit is then pushed through the opening and this portion of the assembly can be facilitated by inserting an elongated strip of metal or plastic tape which performs a function somewhat similar to that of a shoehorn. A tape such as a piece of metal strapping used for packaging purposes is suitable.

Figure 7:
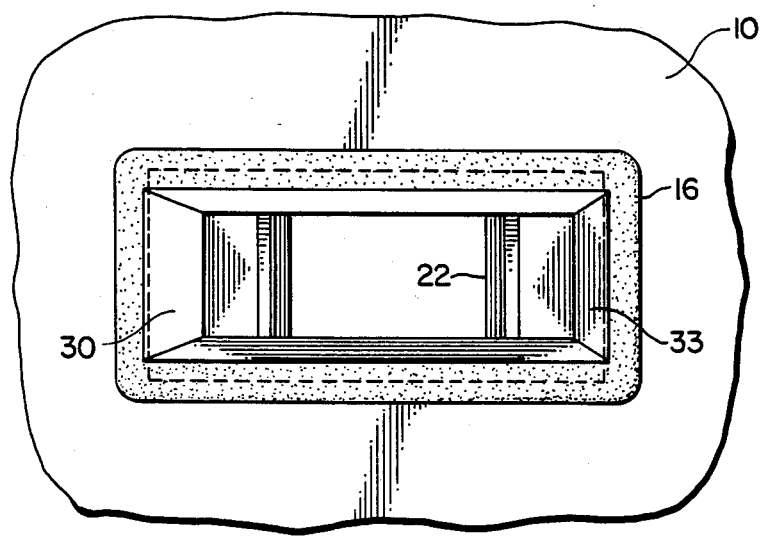
FIG. 7 is an end view, partially cut away, from within the pipe, showing the assembled seal structure.

The final step of assembly is thus accomplished by simultaneously pushing the valve to the right to compress wall 44, pressing the left end of conduit 14 through opening 42 and then withdrawing tape 48, allowing the gasket to expand around the outer surface of conduit 14. The resulting assembly is as shown in FIGS. 6 and 7 wherein the gasket tightly surrounds and forms a good seal with surfaces 31 and 34 of the flanges, the similar surfaces of protrusions 37 and 38 and the opposite surface 36 of body 18. In addition, relatively short ribs 50, 51 can be provided at the upper and lower portions of body 18 to increase pressure against the outer surface of gasket 16.

With the sealing structure thus assembled, tube 20 can be inserted into valve body 18 and the apparatus is ready for use.

While one advantageous embodiment has been chosen to illustrate the invention, it will be understood by those skilled in the art that various changes and modifications can be made therein without departing from the scope of the invention as defined in the appended claims.

What I claim is:

1. A seal structure for forming a watertight connection between a first elongated opening through the wall of a pipe and a conduit leading to a valve comprising the combination of
    a gasket comprising
        a unitarily molded, generally rectangular body of elastomeric material having front and back surfaces and a thickness at least three times the thickness of the pipe wall,
        a continuous groove extending inwardly from the periphery of said body to receive the edges of the pipe wall defining the first opening, and
        a second opening extending axially through said body forming first, second, third and fourth walls around said second opening, said first wall being significantly wider in a radial direction than the opposite one of said walls; and
    a conduit having
        a hollow interior opening at the distal end thereof,
        a generally rectangular outer surface shaped and dimensioned to be at least as large as said second opening before installation,
        first and second flanges protruding laterally from opposite sides of said conduit adjacent the distal end thereof, each of said flanges having a surface perpendicular to the adjacent portion of the outer surface of said conduit with the flange at one side being significantly radially longer than the flange at the opposite side, and
        a stop surface at one end of said conduit, the distance between said stop surface and said flanges being no greater than the thickness of said body;
    whereby said conduit can be coupled to said pipe by placing said gasket in said first opening with said first wall adjacent one side of said first opening and said back wall facing the interior of said conduit, inserting said longer flange on said conduit through said second opening and adjacent the inner surface of said first wall of said gasket, pushing said conduit toward said first wall to elastically compress said first wall, and inserting the other flange so that the stop surface is adjacent the outer, front surface of said gasket.

2. A structure according to claim 1 wherein said first, second, third and fourth walls of said gasket have inwardly facing surfaces, the inwardly facing surface of said first wall being curved from said front surface to said back surface.

3. A structure according to claim 2 wherein the inwardly facing surface of said third wall faces toward said first wall and the front edge of said surface of said third wall is smoothly curved between said surface and said front surface.

4. A structure according to claim 3 wherein the inwardly facing surfaces of said second and fourth walls are flat.

5. A structure according to claim 2 wherein the end surfaces of said conduit are tapered outwardly toward the ends of said flanges.

6. A structure according to claim 5 wherein the flange at said one side is about twice as long as the flange at the other side.

7. A structure according to claim 6 and further including first and second lips protruding beyond the edges of said stop surface adjacent said second and fourth walls of said gasket.

8. A structure according to claim 5 wherein said first wall is about three times as wide as said third wall.

* * * * *